United States Patent [19]
Casse et al.

[11] Patent Number: 4,724,942
[45] Date of Patent: Feb. 16, 1988

[54] CIRCULATING OIL CLUTCH

[75] Inventors: Pierre Casse, Ermont; Alain Huber, Paris, both of France

[73] Assignee: Valeo, Paris, France

[21] Appl. No.: 872,926

[22] Filed: Jun. 11, 1986

[30] Foreign Application Priority Data

Jun. 14, 1985 [FR] France .................. 85 09018

[51] Int. Cl.$^4$ ............................................. F16D 13/72
[52] U.S. Cl. ........................ 192/70.12; 192/113 B; 188/264 D
[58] Field of Search .................. 192/70.12, 113 B; 188/264 D, 264 E

[56] References Cited

U.S. PATENT DOCUMENTS

| | | | |
|---|---|---|---|
| 3,062,347 | 11/1962 | Hornbostol | 192/113 |
| 3,366,210 | 1/1968 | Webster | 188/264 E X |
| 3,530,965 | 9/1970 | Wilson | 195/113 |
| 4,113,067 | 9/1978 | Coons et al. | 192/70.12 X |

FOREIGN PATENT DOCUMENTS

| | | |
|---|---|---|
| 1234540 | 8/1967 | Fed. Rep. of Germany . |
| 983867 | 6/1951 | France . |
| 1289956 | 2/1962 | France . |
| 2315042 | 1/1977 | France . |

Primary Examiner—Carl D. Friedman
Attorney, Agent, or Firm—Charles E. Brown; Charles A. Brown

[57] ABSTRACT

A circulating oil clutch comprises a casing inside which are a friction disk and generally annular pressure and reaction plates, one on each side of the friction disk. These plates are axially movable relative to each other so as to be able to clamp the friction disk between them. Control means are adapted to urge the pressure plate towards the reaction plate, which is adapted to support the assembly axially. Oil circulation channels on the backs of the pressure and reaction plates form parts of a common oil circulation circuit.

23 Claims, 11 Drawing Figures

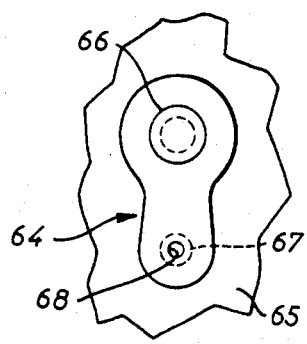
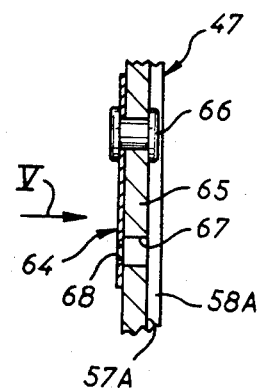
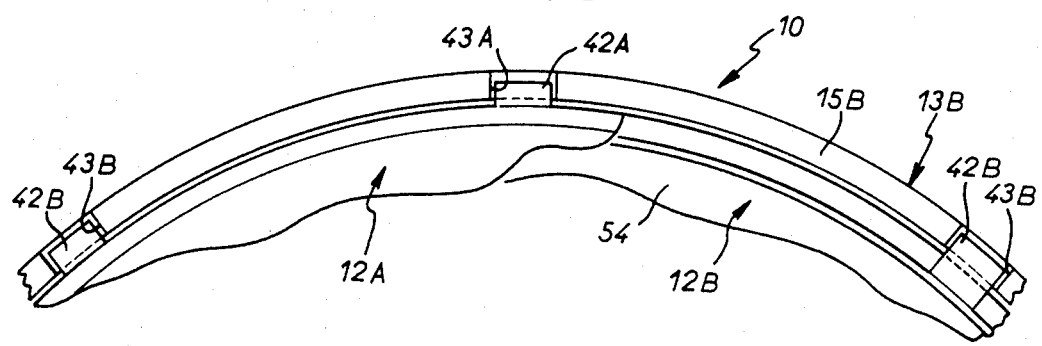
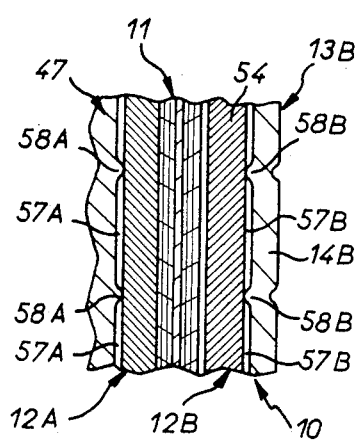
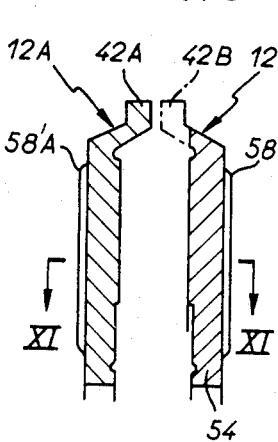
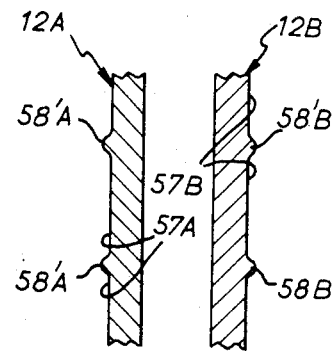

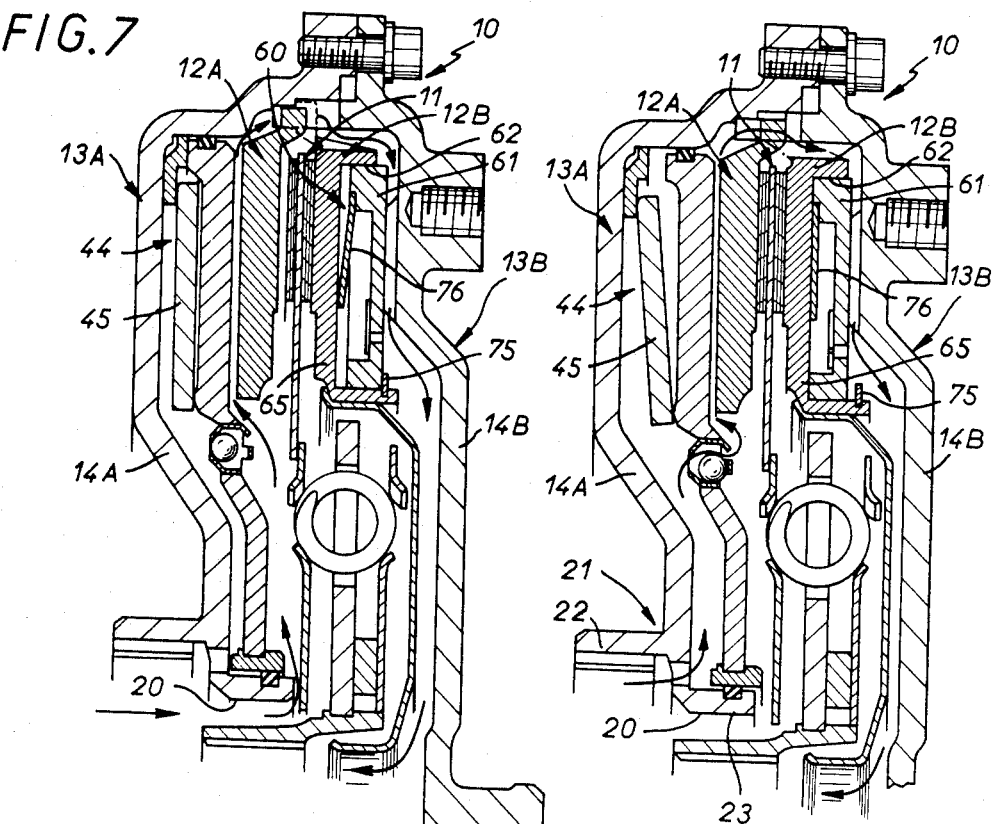
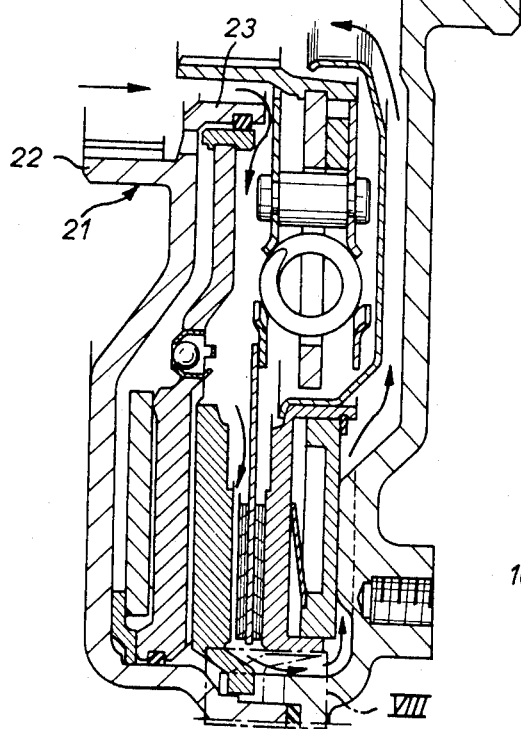
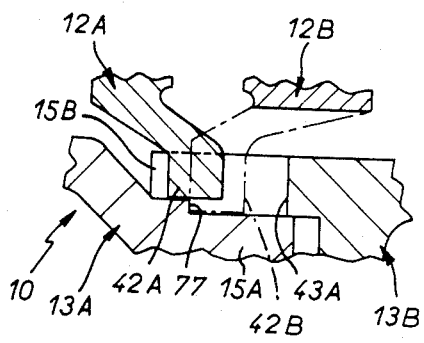

CIRCULATING OIL CLUTCH

BACKGROUND OF THE INVENTION

1. Field of the Invention

The present invention is generally concerned with clutches, usually called "wet" clutches, in which the friction disk or disks employed are immersed in an appropriate liquid, which in practice is oil.

It is more particularly directed to such clutches in which the oil is systematically circulated for simpler and above all faster evacuation of the heat energy produced on engaging or disengaging the clutch, especially when such actions follow on in quick succession and/or when it is a question not of a simple interruption clutch but of a starting clutch, that is to say a clutch through which all of the motor torque is passed, starting with the equipment served more or less completely stopped.

2. Description of the prior act

This is the case with mechanical transmission automobile vehicles, for example, and especially in the case of automobiles where the transmission comprises a variable speed drive in addition to the clutch.

A significant quantity of heat energy has to be removed on each start-up and if there are repetitive start-ups without this heat energy being appropriately dissipated the temperature may increase rapidly with the risk of the more fragile components being damaged and, in particular, of the friction facings concerned being burnt.

To minimize this risk it is known practise to use a plurality of friction disks alternating with intermediate disks.

The corresponding implementations necessarily have a non-negligible overall axial dimension, however, which makes it difficult to install them on automobiles, as the space available is in this case particularly restricted.

French Pat. No. 983.867 of Mar. 31, 1949 proposes a single-disk implementation, however. In this implementation a single friction disk is employed and there are provided within a casing, one of each side of the friction disk, two generally annular plates which are movable axially relative to each other for axially clamping the friction disk and one of which, hereinafter referred to for convenience as the pressure plate, is acted on by control means adapted to urge it towards the other, while this other plate, hereinafter referred to for convenience as the reaction plate, is adapted to support the assembly axially.

In this implementation, and in the conventional manner, the reaction plate is in practice a relatively massive part attached to the casing circumferentially and axially.

Although this makes it possible to provide oil circulation channels on the back of the pressure plate to promote coverage by the oil, it is not a simple matter to make the same provision for the reaction plate.

As a consequence of this, the two sides of the friction disk are cooled to different extents.

If other steps were not taken, this would result in gradual deterioration of the geometry of the friction disk and unequal wear of the corresponding friction facings.

In the implementation described in the aforementioned French patent the friction disk employed is not a conventional friction disk, that is a friction disk with friction facings at the periphery of a flange, but rather a special friction disk.

This friction disk reduces to a flange appropriately reinforced to oppose any distortion and the friction facings are carried one by the pressure plate and the other by the reaction plates, being appropriately and firmly attached thereto.

A general objective of the present invention is an arrangement making it possible to use a conventional friction disk in a circulating oil clutch and conferring further advantages.

SUMMARY OF THE INVENTION

The invention consists in a circulating oil clutch comprising a casing and, in said casing, a friction disk, a generally annular pressure plate and a generally annular reaction plate, one on each side of said friction disk, axially movable relative to each other so as to be able to clamp said friction disk between them, control means adapted to urge said pressure plate towards said reaction plate, which is adapted to support the assembly axially, oil circulation channels on the back of said pressure plate, oil circulation channels on the back of said reaction plate and an oil circulation circuit comprising said oil circulation channels on the backs of said pressure plate and said reaction plate.

In this way balanced cooling of the friction disk is achieved, by which is meant cooling in a comparable manner of both sides thereof, so that the friction disk may without disadvantage be a conventional friction disk with friction facings at the edge of a flange.

In practise the control means associated with the pressure plate comprise spring means, a piston movable within the casing and dividing the interior volume thereof into two chambers in one of which, referred to hereinafter for convenience as the hydraulic chamber, the spring means are located and in the other of which, referred to hereinafter for convenience as the mechanical chamber, the pressure plate, the friction disk and the reaction plate are accommodated, and non-return means through which the two chambers communicate with each other, and the spring means operate on the pressure plate through the intermediary of the piston, the mechanical chamber, containing the pressure plate, the friction disk and the reaction plate, is part of the oil circulation circuit, and the mechanical chamber is divided into two parts by one of said plates.

In this way the oil is circulated over the back of the plates in one radial direction for one of them and in the opposite radial direction for the other.

Circulation of oil in this way is particularly favorable to the required evacuation of heat energy generated on engaging or disengaging the clutch.

The reaction plate is preferably axially movable relative to the casing but constrained to rotate with it, in a similar way to the pressure plate but without necessarily being axially movable like the pressure plate.

As a result, the oil circulation channels on the back of the reaction plate may easily be formed between ribs projecting from the reaction plate and/or a corresponding transverse wall of the casing.

Thus there is no manufacturing difficulty involved in providing these oil circulation channels.

In practise, when the oil circulation channels on the back of the reaction plate are formed between projecting ribs on the reaction plate the pressure and reaction plates may advantageously be identical, procuring a non-negligible reduction in the corresponding manufacturing costs.

A variable volume chamber, hereinafter referred to for convenience as the modulation chamber and formed between two piston-and-cylinder relationship walls, preferably communicates with the mechanical chamber through nozzle means defining different flowrates according to the direction of circulation and is disposed axially between the control means associated with the pressure plate and the transverse wall of the casing axially farthest from the pressure plate.

Filled when the clutch is in the disengaged configuration, this modulation chamber gradually fills when commanded in engagement, advantageously procuring gradual engagement.

The characteristics and advantages of the invention will emerge from the following description given by way of example with reference to the appended drawings.

BRIEF DESCRIPTION OF THE DRAWINGS

FIG. 2 is a cutaway partial view in elevation as seen in the direction of the arrow II in FIG. 1 of part of the internal components of the clutch. FIG. 3 is a partial view in circumferential cross-section on the line III—III in FIG. 1 projected onto a flat plane.

FIG. 4 shows to a larger scale the detail of FIG. 1 indicated by the frame IV.

FIG. 5 is an elevation view of this detail as seen in the direction of the arrow V in FIG. 4.

FIG. 7 is a view in axial cross-section analogous to that of FIG. 1 for an alternative embodiment of the clutch in accordance with the invention.

FIG. 8 shows to a larger scale the detail of FIG. 7 indicated by the frame VIII.

FIG. 9 is a partial view in axial cross-section analogous to that of FIG. 7 for the engaged configuration of the clutch shown.

FIG. 10 is a view in partial axial cross-section analogous to that of FIG. 1 and limited to part of the internal components of the clutch in accordance with the invention, relating to another embodiment of the invention.

FIG. 11 is a partial view of this embodiment in circumferential cross-section on the line XI—XI in FIG. 10 projected onto a flat plane.

DESCRIPTION OF THE PREFERRED EMBODIMENTS

As shown in the figures the clutch in accordance with the invention generally comprises, in a casing 10 and disposed one on each side of a friction disk 11, two generally annular plates 12A and 12B which are at least in part mounted to be axially movable relative to each other for axially clamping the friction disk 11, as will be described in more detail later.

As will also be described in more detail later, the plate 12A referred to hereinafter for convenience as the pressure plate is acted on by control means adapted to urge it towards the other plate 12B which, hereinafter referred to for convenience as the reaction plate, is adapted to support the assembly axially.

In the embodiment shown the casing 10, which is sealed, is formed by two shell members 13A and 13B each of which has a generally transverse wall 14A, 14B and, at the outside edge of this, a generally axial rim 15A, 15B; their concave sides facing each other axially, their axial rims 15A and 15B are nested one within the other and fastened to each other, in practise by welding, the axial rim 15A of the shell member 13A in practise overlaying at least part of the rim 15B of the shell member 13B.

Figure 1:
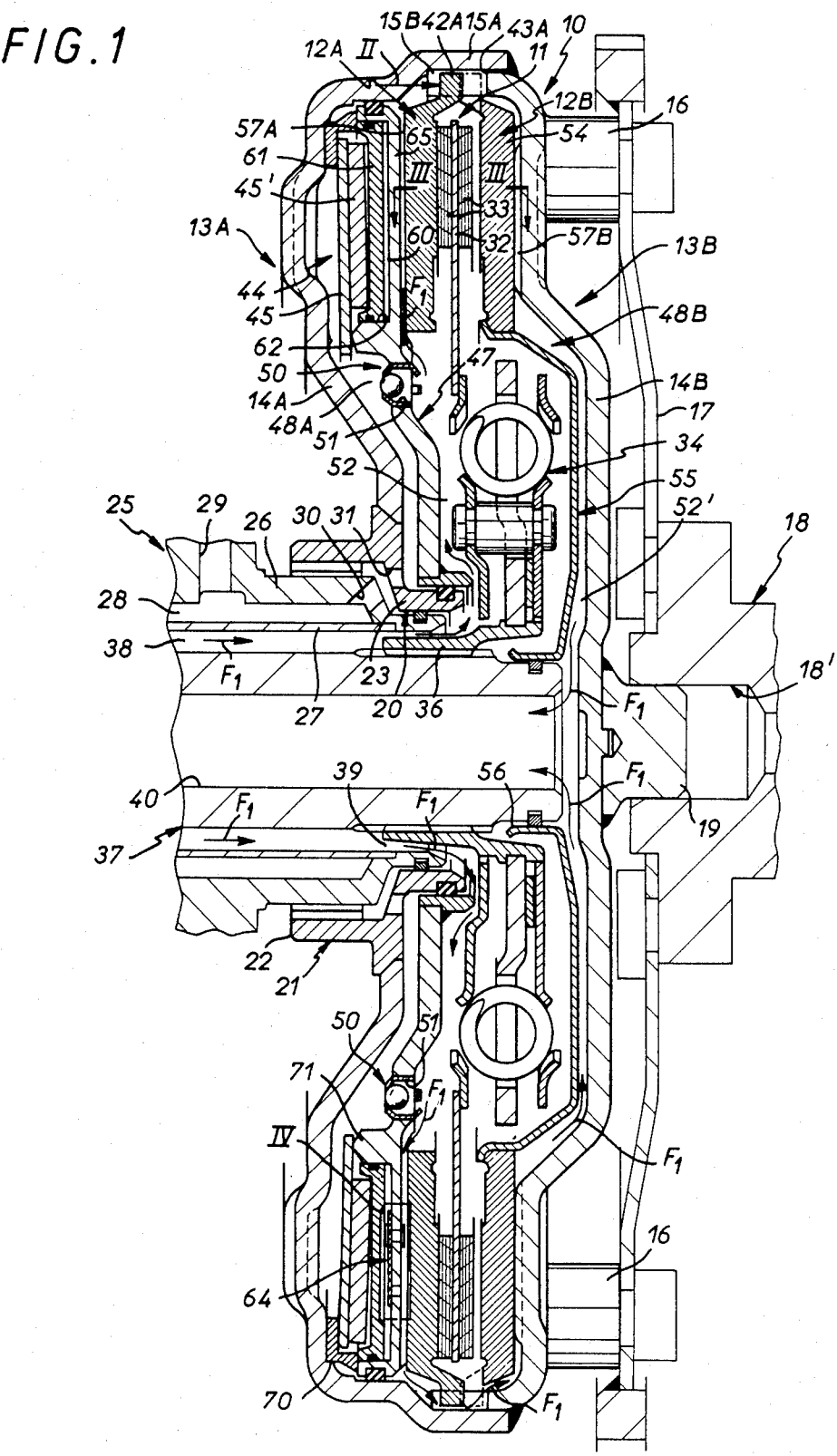
FIG. 1 is a view in axial cross-section of a clutch in accordance with the invention in the disengaged configuration.

On the back of the transverse wall 14B of the shell member 13B, in the vicinity of its edge, are a plurality of projecting studs 16 appropriately distributed circumferentially and by means of which, as shown in thin lines in FIG. 1, the assembly may be fixed to a flange 17 in order to constrain it to rotate with a first shaft 18, in practice a driving shaft, and an axial stud 19 by means of which the assembly may be centred on this shaft, by inserting this stud into a bore 18' provided in the end of the shaft.

The transverse wall 14B of the shell member 13B is unapertured.

The transverse wall 14A of the shell member 13A has a wide central opening 20 in its median area.

In the embodiment specifically shown in FIGS. 1 to 6, this central opening 20 in practice forms part of a bush 21 which is separate from the main part of the transverse wall 14A and appropriately attached to it in fluid-tight manner.

In the embodiment shown in FIG. 7 it forms part of the transverse wall 14A, the bush 21 being in this case in one piece with it.

Be this as it may, for reasons which will engage hereinafter the opening 20 is bordered circumferentially by an outwardly projecting axial collar 22 and an inwardly projecting axial collar 23 disposed on a circumference of smaller radius than the collar 22.

As shown schematically in thin line in FIG. 1 the casing 10 may be fitted, in practise in fluid-tight manner, to a fixed sleeve 25 by means of the collars 22 and 23 that the transverse wall 14A of the shell member 13A thus features.

The fixed sleeve 25 forms internally, between two cylindrical wall 26, 27 approximately fastened together in fluid-tight manner, an annular space 28 which may be coupled to an oil circulation circuit by a passage 29 and can communicate with the internal volume of the casing 10 through holes 30 which discharge substantially in line with axial passages 31 provided for this purpose and appropriately distributed in the circumferential direction on the transverse wall 14A of the shell member 13A of the casing 10, between the collars 22 and 23.

In practise the transverse walls 14A, 14B of the shell members 13A, 13B that constitute the casing 10 are not plane; instead each has an axially staggered structure.

As the corresponding provisions are within the competence of those skilled in the art they will not be described in detail here.

The friction disk 11 is also well known per se and will not be described in detail here either.

Suffice to say that it comprises a transverse support flange 32 with friction facings 33 on either side of its outside edge and carried through its inside edge, in practise through the intermediary of a torsional damper device 34 in the embodiment shown, by a hub 36.

As shown schematically in thin line in FIG. 1, the friction disk 11 is adapted to be constrained by the hub 36 to rotate with a second shaft 37, in practise a driven shaft, substantially aligned with the driving shaft 18 and entering the casing 10 through the central opening 20 in the transverse wall 14A of its shell member 13A.

In practise there remains between the driven shaft 37 and the fixed sleeve 25 an annular space 38 which is coaxial with the aforementioned annular space 28 and which, like the latter, is adapted to be connected by a passage (not shown) to an oil circulation circuit and to communicate with the internal volume of the casing 10 through an annular passage between it and the hub 36 of the friction disk 11.

In practise, for reasons that will emerge hereinafter the shaft 37 of the friction disk 11 is hollow, featuring an internal bore 40 through which it discharges into the interior volume of the casing 10.

In the embodiments shown the pressure plate 12A is of unitary construction, reducing to a relatively massive ring with substantially parallel transverse surfaces.

It is axially movable within the casing 10, whilst being constrained to rotate with the casing.

To this end, there is provided in the embodiments shown a mortice and tenon coupling between the pressure plate 12A and the casing 10.

In practice, in the embodiments shown this mortice and tenon coupling employs a plurality of lugs 42A projecting generally radially from the outside edge of the pressure plate 12A and appropriately distributed in the circumferential direction, for example in pairs at 90° to each other, each meshing with a groove 43A provided in corresponding relationship to them on the axial rim 15B of the shell member 14B of the casing 10, this axial groove 43A in practice affecting all of the thickness of the axial rim 15B.

The control means associated with the thus constituted pressure plate 12A comprise spring means 44.

In the embodiments shown these are one or more conical washers of the Belleville washer type.

In the embodiment specifically shown in FIGS. 1 through 6 and as will be described in more detail hereinafter there are two Belleville washers 45, 45'.

Be this as it may, the spring means 44 thus constituting the control means associated with the pressure plate 12A do not act on the pressure plate directly but rather through the intermediary of a piston 47 axially movable within the casing 10 and dividing the internal volume of the casing in fluid-tight manner into two separate chambers in one of which, hereinafter referred to for convenience as the hydraulic chamber 48A, the spring means 44 are accommodated and in the other of which, hereinafter referred to for convenience as the mechanical chamber 48B, the pressure plate 12A, the friction disk 11 and the reaction plate 12B are accommodated.

In practice, the piston 47 cooperates in fluid-tight manner through its inside edge with the inwardly projecting collar 23 on the transverse wall 14A of the shell member 14A of the casing 10; through its outside edge it cooperates in fluid-tight manner with a bearing surface on the axial rim 15A of the shell member 13A.

Because of these arrangements, the hydraulic chamber 48A communicates with the annular space 28 in the fixed sleeve 25 through the passages 31 in the transverse wall 14A of the shell member 13A and the mechanical chamber 48B communicates with the annular space 38 coaxial with the aforementioned space around the shaft 37 of the friction disk 11, between the fixed sleeve 25 and the shaft 37, through the annular passage 39.

The hydraulic chamber 48A and the mechanical chamber 48B also communicate with each other through non-return means.

In the embodiments shown these are a plurality of non-return valves 50 appropriately distributed in the circumferential direction and each fitted into a hole 41 in the piston 47, being disposed so as to authorize circulation of oil from the hydraulic chamber 48A to the mechanical chamber 48B and to oppose any circulation in the opposite direction.

The mechanical chamber 48B is in turn divided into two parts by one of the plates 12A, 12B: one part 52, as described above, communicates directly with the first annular space, namely the annular space 38 formed around the shaft 37 of the friction disk 11, and communicates through the hydraulic chamber 48A and non-return means 50 controling communication between this and the mechanical chamber 48B with a second annular space, namely the annular space 28 coaxial with the aforementioned annular space; a second part 52' communicates with the internal bore 40 in the shaft 37 of the friction disk 11, which internal bore 40 also forms part of the oil circulation circuit.

In the embodiments shown it is the reaction plate 12B which divides the mechanical chamber 48B in this way.

In practise the reaction plate 12B comprises a relatively massive peripheral part 54 forming the reaction plate proper, in face-to-face relationship with the pressure plate 12A, and a central part 55 attached to the peripheral part and connecting this in fluid-tight manner to the shaft 37 of the friction disk 11.

In the practise the central part 55, of pressed sheet metal, for example, has its outside edge crimped to the massive peripheral part 54 with which it is associated and has at its inside edge an axial collar 56 by means of which it is engaged on the shaft 37 of the friction disk 11.

Like the pressure plate 12A, the reaction plate 12B is axially mobile relative to the casing 10 although constrained to rotate with it, but unlike the pressure plate 12A and in order to be capable of supporting the assembly axially it bears axially against the casing 10 and in practice against the transverse wall 14B of the corresponding shell member 13B thereof.

For constraining the reaction plate 12B to rotate with the casing 10 there is provided a mortice and tenon coupling of the same type as that operative between the pressure plate 12A and the casing 10, but with an alternating circumferential disposition of the mortices and tenons in corresponding relationship on the two plates.

Thus in the embodiment shown this mortice and tenon coupling comprises a plurality of lugs 42B projecting generally radially from the outside edge of the reaction plate 12B, appropriately distributed in the circumferential direction, in pairs at 90° for example, and each meshing with an axial groove 43B through the full thickness of the radial rim 15B of the shell member 13B of the casing 10, the axial grooves 43B in this axial rim 15B alternating circumferentially with those 43B corresponding to the mortice and tenon coupling operative between the pressure plate 12A and the casing 10 (FIG. 2).

In practise there is clearance between the plates 12A, 12B and the axial rim 15B of the shell member 13B of the casing 10 at their outside edges, and also between the lugs 42A, 42B and the axial grooves 43A, 43B of the corresponding mortice and tennon couplings, with the result that the two parts 52, 52' of the mechanical chamber 48B communicate with each other at the outside edges of the plates 12A, 12B.

Oil circulation channels 57A are provided on the back of the pressure plate 12A.

In the embodiments specifically shown in FIGS. 1 through 9, the oil circulation channels 57A are formed between ribs 58A, projecting from the piston 47 with which the pressure plate 12A is in back-to-back relationship, the piston 47 being then able to bear on the pressure plate 12A only through the tops of these ribs 58A (FIG. 3), which are substantially radial.

Be this as it may, in accordance with the invention the oil circulation channels 57A thus provided on the back of the pressure plate 12A form part of an oil circulation circuit of which the oil circulation channels 57B on the back of the reaction plate 12B also form part.

In the embodiments specifically shown in FIGS. 1 through 9, the oil circulation channels 57B thus provided on the back of the reaction plate 12B are formed between ribs 58B projecting from the transverse wall 14B of the corresponding shell member 13B of the casing 10 in line with the massive part 54 of the reaction plate 12B, this part then bearing on the transverse wall 14B only through the tops of the ribs 58B.

As previously, the ribs 58B that the transverse wall 14B of the shell member 13 of the casing 10 thus features are subsantially radial.

In practise they are formed by localized stamped out parts of the transverse wall 14B.

As will emerge hereinafter, the oil circulation circuit of which the oil circulation channels 57A, 57B form part is that of which, as already described, the annular spaces 28 and 38, the hydraulic chamber 48A, the mechanical chamber 48B and the internal bore 40 in the shaft 37 of the friction disk 11 form part.

In the case of the oil circulation channels 57A, 57B, and as will emerge subsequently, the oil is circulated in one radial direction for one of the plates 12A and 12B concerned and, after flowing round the outside edges of the plates, in the opposite radial direction for the other plate.

In the embodiments shown the clutch in accordance with the invention further comprises a variable volume chamber 60 herinafter referred to for convenience as the modulation chamber formed between two piston-and-cylinder related walls and communicating with the mechanical chamber 28B through nozzle means defining different flowrates according to the circulation direction; it is disposed axially between the control means associated with the pressure plate 12A and the transverse wall 14B of the casing 10 axially farthest from the pressure plate.

In the embodiments specifically shown in FIGS. 1 through 6 the modulation chamber 60 is incorporated into the piston 47.

In practise the piston 47 itself forms one of the walls delimiting the modulation chamber 60, and the other wall thereof is formed by an annular washer 61 mounted to slide in fluid-tight manner within an annular recess 62 forming a cylinder hollowed out of the piston 47 on the side thereof facing away from the pressure plate 12A.

The differential flowrate nozzle means provided between the modulation chamber 60 and the mechanical chamber 48B comprise at least one flap valve 64.

As is best seen in FIGS. 4 and 5, this is a metal or otherwise flap disposed in the recess forming the cylinder 62 for the piston 47. It is in contact with and fastened to the bottom 65 of this recess 62 (by a rivet 66 as shown here, for example), its free end featuring in line with an opening 67 passing right through the bottom 65 and therefore discharging into the mechanical chamber 48B, more precisely into the part 52 thereof and in one of the corresponding oil circulation channels 57A, an opening 68 smaller than the opening 67.

In practise, part at least of the spring means 44 constituting the control means associated with the pressure plate 12A bears on the annular washer 61 forming one of the walls delimiting the modulation chamber 60.

To this end, in the embodiment shown in FIGS. 1 through 6 the two Belleville washers 45 and 45A' constituting the spring means 44 have different radii dimensions and thicknesses.

The washer 45 with the greater radius and, in the embodiment shown, the lesser thickness in the axial direction, bears through its outside edge on the transverse wall 14A of the shell member 13A of the casing 10, in the embodiment shown through the intermediary of an annular bearing spacer 70; through its inside edge it bears on the piston 47, more precisely on an annular boss 71 projecting axially to this end from the piston towards the transverse wall 14A, radially short of the modulation chamber 60.

The other Belleville washer 45', which is thus that with the smaller radius and the greater axial thickness, bears through its outside edge on the Belleville washer 45 and thus through this and through the annular spacer 70 on the transvere wall 14A of the shell member 13A of the casing 10; through its inside edge it bears on the annular ring 61 forming one of the walls delimiting the modulation chamber 60.

When in service, and subject to the control actions of a distributor that is not shown, pressurized oil can reach either the annular space 28 through the passage 29 or the annular space 38 through a passage which is not shown.

The pressure of this oil is in the order of 5 to 10 bars, for example.

When as schematically represented by the arrows F1 in FIG. 1 it reaches the annular space 38, the oil circulates in the casing 10 as follows:

Through the annular passage 39 the oil reaches the mechanical chamber 48B, more precisely its part 52, and then after bathing the back of the pressure plate 12A, over which it circulates in a first radial direction in the corresponding oil circulation channels 57A, it flows around the outside edges of the pressure plate 12A and the reaction plate 12B and then bathes the back of the reaction plate 12B as it circulates in the opposite radial direction in the corresponding oil circulation channels 57B; it then leaves the casing 10 through the internal bore 40 in the shaft 37 of the friction disk 11.

The oil circulating in this way is prevented from reaching the hydraulic chamber 48A by the non-return valves 50.

Although, ignoring any head losses, the same pressure is exerted on both sides of each of the plates 12A, 12B, this does not apply in the case of the piston 47 which is exposed to the full pressure of the circulating oil on the side facing towards the mechanical chamber 48B and no pressure on the side facing towards the hydraulic chamber 48A, this hydraulic chamber 48A communicating at this time with the annular space 28 and, through this, with a discharge outlet.

The piston 47 is thus pushed towards the transverse wall 14A of the shell member 13A of the casing 10 until equilibrium is established between the forces acting on it, namely the hydraulic pressure on the side facing towards the mechanical chamber 48B and the spring force applied by the spring means 45 on the side facing towards the hydraulic chamber 48A.

As the pressure plate 12A is thus not subjected to any loading, the friction disk 11 is unclamped, as shown, and the clutch concerned is thus in the disengaged stated.

Oil under pressure has reached the modulation chamber 60 through the opening 67 in the piston 47 controlled by the flap valve 64, within the limits of the equilibrium of forces mentioned previously, however.

Thus for the disengaged configuration of the clutch the spring means 45 constituting the control means associated with the pressure plate 12A are counterbalanced by the hydraulic pressure, partly through the piston 47 alone and partly through the piston 47, the modulation chamber 60 and the annular ring 61 forming one of the walls delimiting this chamber.

Figure 6:
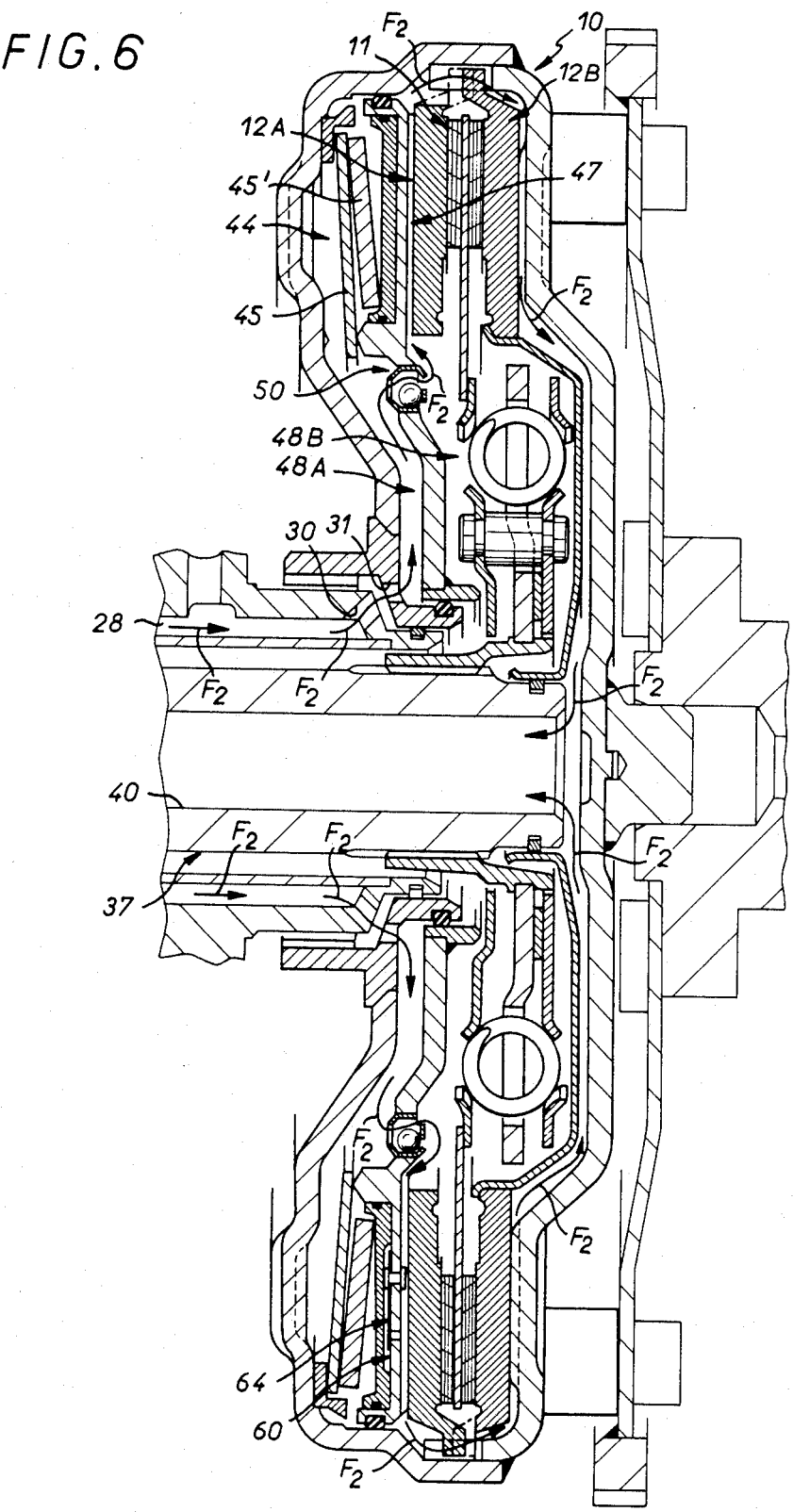
FIG. 6 is a view in axial cross-section analogous to that of FIG. 1 for the engaged configuration of the clutch in accordance with the invention.

It will now be assumed that in response to a reversal of the control situation pressurized oil enters the annular space 28, as schematically represented by the arrows F2 in FIG. 6.

The oil then circulates in the casing 10 as follows:

The oil first enters the hydraulic chamber 48A through the passages 30 and 31, before passing into the mechanical chamber 48B through the non-return valves 50.

On reaching the mechanical chamber 48B, its path is then the same as previously: it bathes the back of the pressure plate 12A, flows around the edges of the pressure plate 12A and the reaction plate 12B, bathes the back of the reaction plate 12B and leaves the casing 10 through the internal bore 40 in the shaft 37 of the friction disk 11.

Ignoring any head losses, the same pressure is thus exerted on both sides of the piston 47 and since the piston is no longer able to counterbalance the spring means 44 these urge the pressure plate 12A towards the reaction plate 12B.

In practise they operate in two stages.

During a first stage only the Belleville washer 45 is operative, the Belleville washer 45' being counterbalanced by the oil in the modulation chamber 60.

This action of the Belleville washer 45 is sufficient to bring the friction disk 11 into contact with the reaction plate 12B.

Due to the action of the Belleville washer 45' the modulation chamber is progressively emptied of oil through the reduced aperture nozzle 68 of the flap valve 64.

Once the oil has been evacuated from the modulation chamber 60 in this way the Belleville washer 45' becomes operative, its effect being added to that of the Belleville washer 45.

The friction disk 11 is then clamped between the pressure plate 12A and the reaction plate 12B and the clutch is therefore engaged.

It will be understood that because of the modulation chamber 60 some degree of gradualness is introduced into this change to the engaged condition of the clutch.

In the embodiment shown in FIG. 7 the modulation chamber 60 is incorporated into the reaction plate 12B.

In this case it is through the annular washer 61 which forms one of the walls delimiting the modulation chamber 60 that the reaction plate 12B can bear on the transverse wall 14B of the shell member 13B of the casing 10 and so support the assembly axially.

As can be seen in FIG. 7 the travel of the annular washer 61 in the corresponding hole 62 in the reaction plate 12B is limited on the side opposite the bottom 65 of the recess 62 by an abutment 75 consisting, for example and as shown here, of a split washer locked into a groove on the reaction plate 12B.

This arrangement may also be adopted in the previous embodiment, of course.

In the embodiment shown in FIG. 7 a spring washer 76, of the Belleville washer type, for example, is provided between the annular ring 61 and the bottom 65 of the recess 62 in the reaction plate 12B, inside the modulation chamber 60.

There is also provided an abutment for the reaction plate 12B in the corresponding axial direction.

For example and as shown here, this abutment is formed by a transverse shoulder 77 on the axial rim 15A of the shell member 13A of the casing 10 (FIG. 8). of the shell member 13A of the casing 10 (FIG. 8).

Finally, in the embodiment shown a single Belleville washer 45 is provided for the spring means 44 constituting the control means associated with the pressure plate 12A.

For the remainder the arrangements are of the same type as previously described and operation is also the same.

In the embodiment schematically represented in FIG. 10 the fluid circulation channels 57A on the back of the pressure plate 12A are formed between ribs 58'A projecting from the pressure plate 12A and those 57B on the back of the reaction plate 12B are formed between ribs 58'B projecting from the reaction plate 12B.

Thus if desired the plates 12A and 12B may advantageously be at least in part identical to the massive part 54 of the reaction plate 12B.

The present invention is of course not limited to the embodiments described and shown but encompasses any variant execution and/or combination of their various component parts.

In particular, the oil circulation channels on the back of the pressure plate and the reaction plate may have any configuration provided that they are adapted to procure a circulation of oil between the inside and outside edges of the plates.

What is claimed is:

1. Circulating oil clutch comprising a casing and, in said casing, a friction disk, a generally annular pressure plate and a generally annular reaction plate, one on each side of said friction disk, axially movable relative to each other so as to be able to clamp said friction disk between them, control means adapted to urge said pressure plate towards said reaction plate, which is adapted to support the assembly axially, oil circulation channels on the back of said pressure plate, oil circulation channels on the back of said reaction plate and an oil circulation circuit comprising said oil circulation channels on the backs of said pressure plate and said reaction plate, said control means associated with said pressure plate comprising spring means, a piston movable within said casing dividing the internal volume thereof into two chambers: a hydraulic chamber in which said spring means are accommodated and a mechanical chamber in which said pressure plate, said friction disk and said reaction plate are accommodated, and non-return means whereby said chambers communicate with each other, said spring means being operative on said pressure plate through the intermediary of said piston and said mechanical chamber accommodating said pressure plate, said friction disk and said reaction plate forming part of said oil circulation circuit, said mechanical chamber being divided into two parts by one of said plates so that oil is circulated over the backs of said plates in one radial direction for one of them and the opposite radial direction for the other.

2. Clutch according to claim 1, comprising a hollow shaft with which said friction disk is constrained to rotate and the internal bore in which forms part of said oil circulation circuit, one of said parts of said mechanical chamber being in communication with said bore.

3. Clutch according to claim 2, wherein an annular space formed around said shaft of said friction disk is in direction communication with one of said parts of said mechanical chamber and another annular space around said shaft, coaxial with the aforementioned annular space, communicates with said part of said mechanical chamber through said hydraulic chamber and said non-return means controling communication between said hydraulic chamber and said mechnical chamber, both of said annular spaces forming part of said oil circulation circuit.

4. Clutch according to claim 2, wherein one of said plates comprises a relatively massive peripheral part forming the plate proper and a relatively thin central part fastened to said peripheral part and connecting it in fluid-tight manner to said shaft of said friction disk.

5. Clutch according to claim 4, wherein said plate in two parts is said reaction plate.

6. Clutch according to claim 1, comprising a variable volume modulation chamber formed between two walls in piston-and-cylinder relationship to each other and further comprising nozzle means whereby said modulation chamber communicates with said mechanical chamber, the flowrate of such communication differing according to the direction of circulation, said modulation chamber being disposed of axially between said control means associated with said pressure plate and the transverse wall of said casing axially farthest from said pressure plate.

7. Clutch according to claim 6, wherein said modulation chamber is incorporated into said piston which itself forms one of the walls delimiting said modulation chamber.

8. Clutch according to claim 7, comprising spring means constituting at least in part said control means associated with said pressure plate and bearing on the other of the walls delimiting said modulation chamber.

9. Clutch according to claim 7, wherein said spring means comprise two Belleville washers of which one bears on said piston and the other bears on the wall concerned of said modulation chamber.

10. Clutch according to claim 6, wherein said modulation chamber is incorporated into one of said plates.

11. Clutch according to claim 11, wherein said modulation chamber is incorporated into said reaction plate.

12. Clutch according to claim 1, wherein said piston is provided with projecting ribs and said oil circulation channels on the back of said pressure plate are formed between said ribs.

13. Clutch according to claim 1, wherein said pressure plate is provided with projecting ribs and said oil circulation channels at the back of said pressure plate are formed between said ribs.

14. Circulating oil clutch comprising a casing and, in said casing, a friction disk, a generally annular pressure plate and a generally annular reaction plate, one of each side of said friction disk, axially movable relative to each other so as to be able to clamp said friction disk between them, control means adapted to urge said pressure plate towards said reaction plate, which is adapted to support the assembly axially, oil circulation channels on the back of said pressure plate, oil circulation channels on the back of said reaction plate and an oil circulation circuit comprising said oil circulation channels on the backs of said pressure plate and said reaction plate, said oil circulation circuit having a control flow pathway for operating the clutch and a cooling flow pathway for cooling said plates and said friction disk, said flow pathways being adapted to communicate with each other, circulating means for causing oil to circulate radially inwardly on the back of one of said plates and means for causing oil to circulate radially outwardly on the back of the other of said plates.

15. Clutch according to claim 14, wherein a transverse wall of said casing is provided with projecting ribs and said oil circulation channels at the back of said reaction plate are formed between said ribs.

16. Clutch according to claim 14, wherein said reaction plate is provided with projecting ribs and said oil circulation channels at the back of said reaction plate are formed between said ribs.

17. Clutch according to claim 14, wherein said plates are identical.

18. Circulating oil clutch comprising a casing and, in said casing, a friction disk, a generally annular pressure plate and a generally annular reaction plate, one on each side of said friction disk, axially movable relative to each other so as to be able to clamp said friction disk between them, control means adapted to urge said pressure plate towards said reaction plate, which is adapted to support the assembly axially, oil circulation channels on the back of said pressure plate, oil circulation channels on the back of said reaction plate and an oil circulation circuit comprising said oil circulation channels on the backs of said pressure plate and said reaction plate, said casing defining an internal volume, and there being a piston dividing the internal volume of said casing into a hydraulic chamber accommodating said control means and a mechanical chamber accommodating said pressure plate, said friction disk and said reaction plate, and means for providing communication between said chambers.

19. Clutch according to claim 18, comprising respective mortice and tenon couplings of the same type between each of said plates and said casing, with an alternating circular disposition of said tenons and said mortices in corresponding relationship on said plates.

20. Clutch according to claim 18, wherein said reaction plate is movable axially relative to said casing but constrained to rotate with it.

21. Clutch according to claim 18, wherein said means providing communication between said chambers comprises a non-return valve means.

22. Clutch according to claim 18, wherein said casing has an inlet communicating with said mechanical chamber and another inlet communicating with said hydraulic chamber.

23. Clutch according to claim 18, wherein said plates are identical.

* * * * *